Feb. 11, 1930.   A. B. BELL   1,746,986
CAR SEAT
Filed July 25, 1928   6 Sheets-Sheet 1
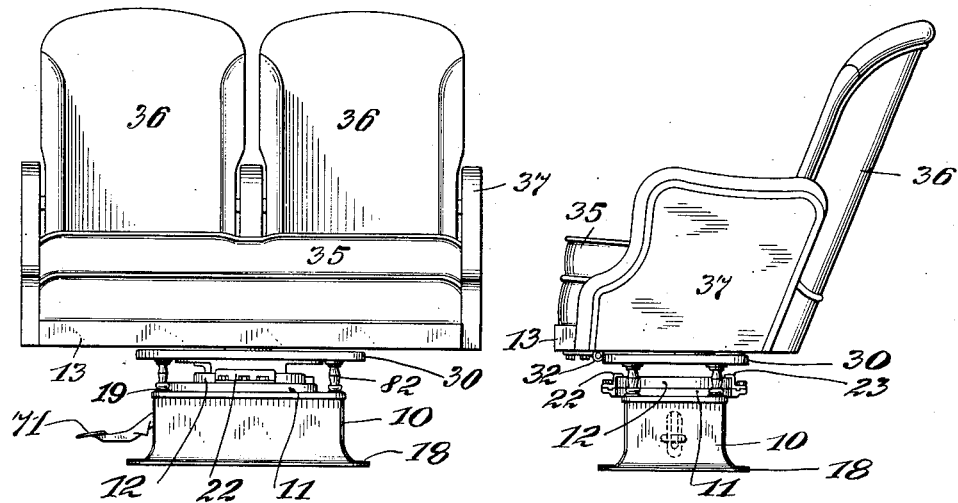
*Fig. 1.*   *Fig. 2.*
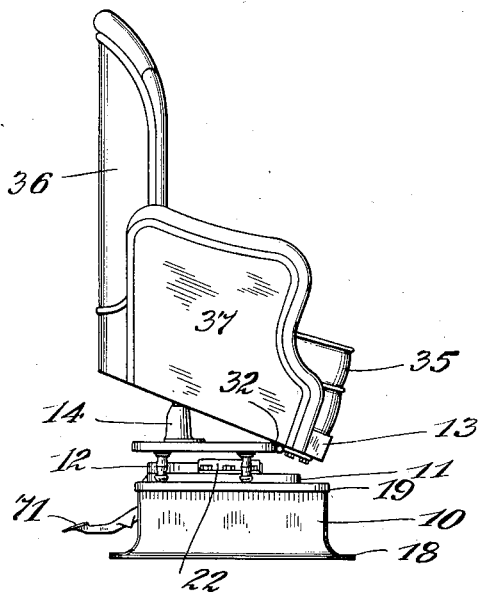
*Fig. 3.*
INVENTOR
Alfred B. Bell
BY
his ATTORNEY

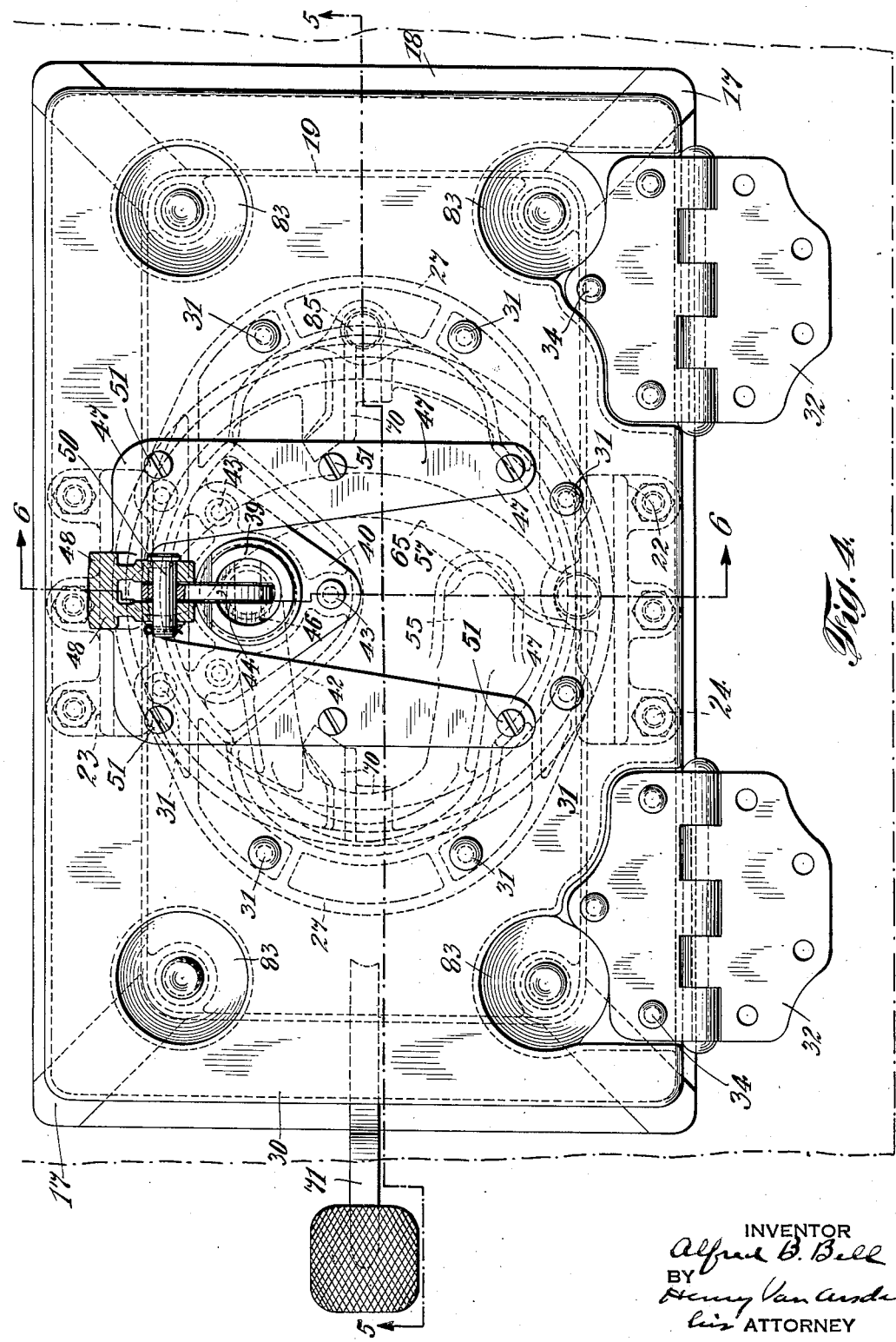

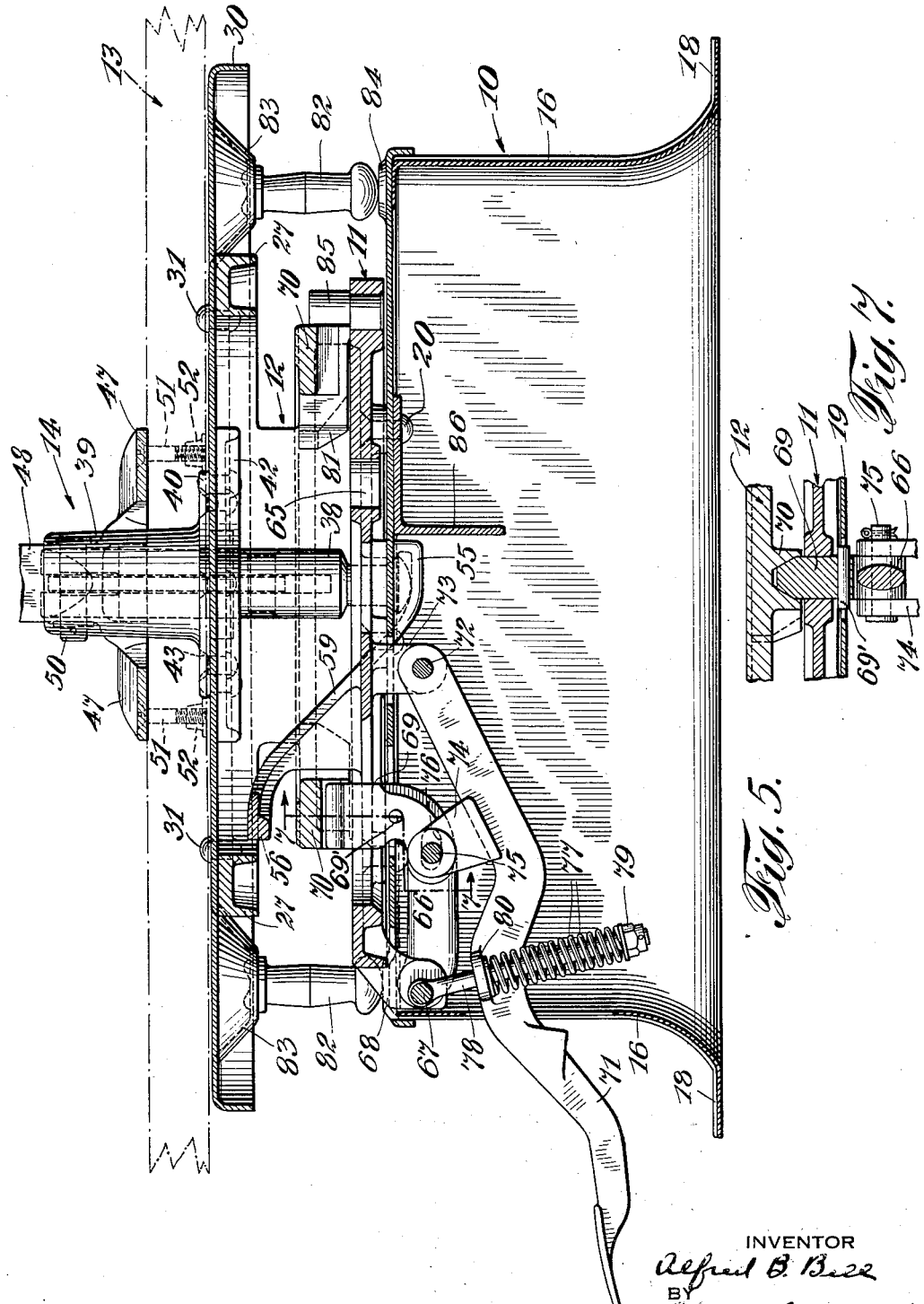

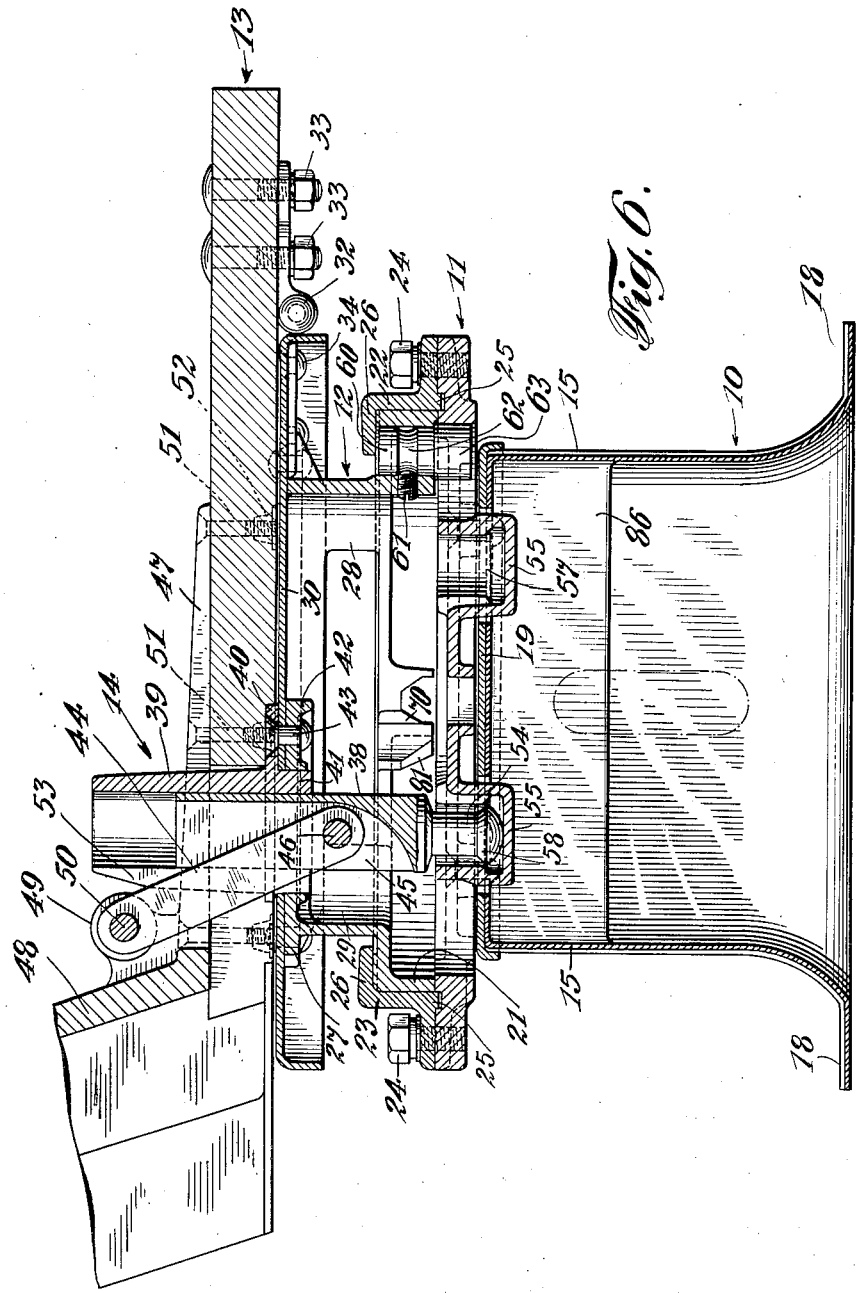

Feb. 11, 1930.  A. B. BELL  1,746,986
CAR SEAT
Filed July 25, 1928   6 Sheets-Sheet 5

INVENTOR
Alfred B. Bell
BY
his ATTORNEY

Feb. 11, 1930.  A. B. BELL  1,746,986
CAR SEAT
Filed July 25, 1928  6 Sheets-Sheet 6
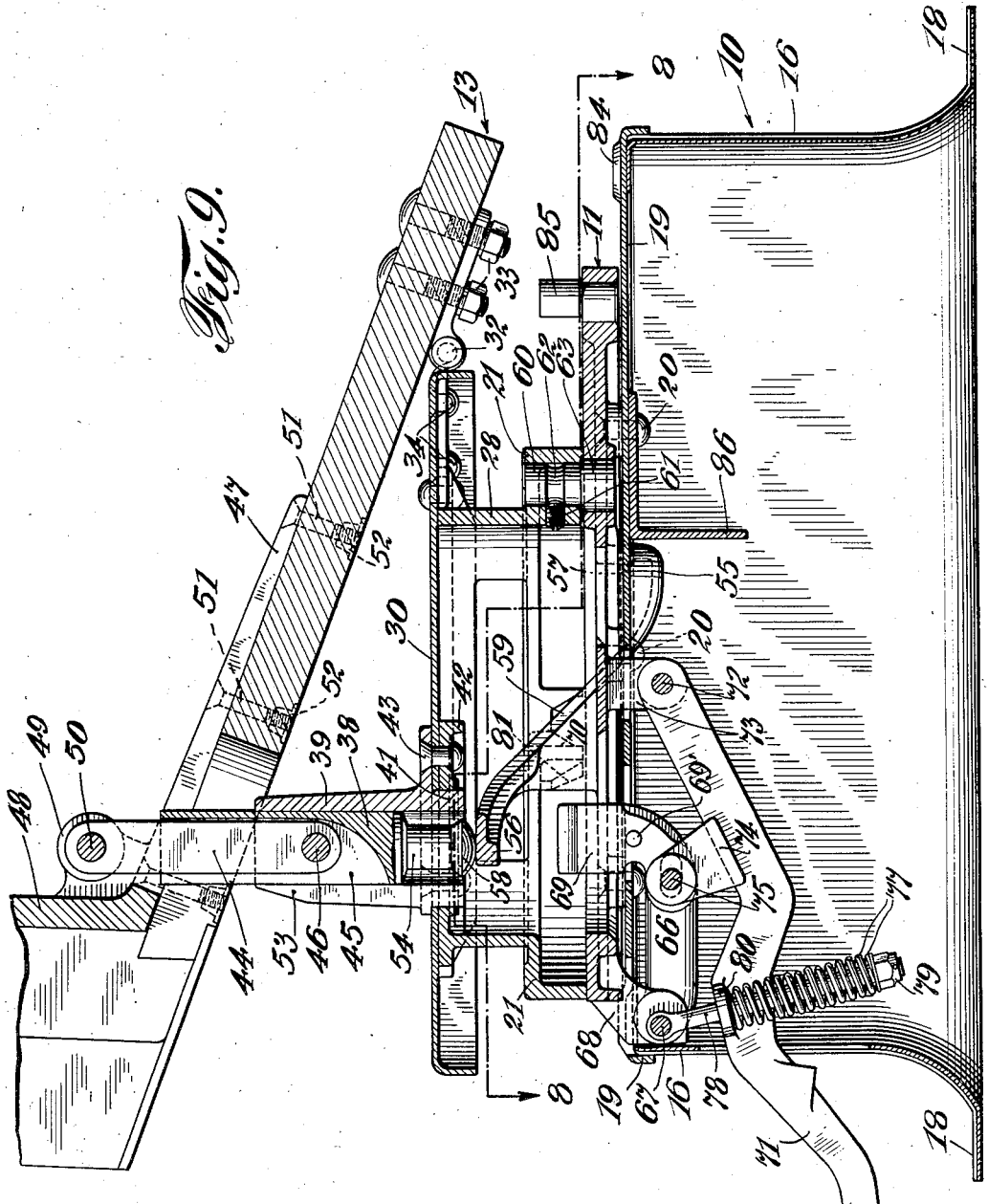
INVENTOR
Alfred B. Bell
BY
Henry Van Arsdale
his ATTORNEY Patented Feb. 11, 1930

1,746,986

UNITED STATES PATENT OFFICE

ALFRED B. BELL, OF PHILADELPHIA, PENNSYLVANIA, ASSIGNOR TO HALE & KILBURN CO., OF PHILADELPHIA, PENNSYLVANIA, A CORPORATION OF DELAWARE

CAR SEAT

Application filed July 25, 1928. Serial No. 295,252.

This invention relates to car seats, and more particularly to car seats for railway coaches, busses and tram cars, which may be revolved to face toward either end of the car, certain predetermined shifting and tilting movements of the seat taking place as the same is revolved for the purpose of economizing space and avoiding the car wall and adjacent seats during the revolution movement.

To make bus and railway transportation attractive to the public and profitable to the operator requires that the particular conveyance be provided with seating accommodations for the maximum number of passengers and at the same time provided with seats that are steady, sturdy, comfortable and easily reversible in facing direction by the passenger or attendant, and which create an impression of attractiveness, restfulness and security.

To maintain the seating capacity in a particular conveyance to a maximum consonant with comfort, and yet permit reversal of the seats in the seating direction, various arrangements have been devised. The most common type of reversible seat is adapted to seat two passengers and can be reversed by moving the seat back over the seat cushion from one side to the other. While this type of seat permits a maximum seating arrangement, the seats are lacking in both comfort and attractiveness. The ease and comfort of the seat depends to a great extent on the depth of the springs and upholstery and the pitch of both the cushion and the back. Seats of the reversible back type, as is well known, require that both sides of the back contain springs and upholstery for seating use. To permit easy movement of the seat back and to conserve space, it is clear that these seats require comparatively thin cushions and thin backs and the depth of the springs must, therefore, be very limited and the upholstery meagre.

It is clear that to obtain maximum ease and comfort through maximum depth of springs and upholstery, the cushion and seat back must remain relatively in the same position, whichever way the seat is facing.

Stationary seats have permitted deep and luxurious upholstery, but here the passenger must ride backwards when the conveyance is traveling one way. Seats now in use, such as the ordinary parlor car seat, have deep and comfortable upholstery and are reversible, but these take up a great deal of space, cutting the seating capacity of the car in half. Each type of seat referred to is, therefore, open to serious limitations and objections. The reversible seats now in use lack comfort comparable to a parlor car type of seat. The parlor car seat limits the seating capacity unduly, necessitating increased fare for this type of transportation. Stationary seats require the occupant to ride backwards when the conveyance is moving one way.

It is apparent, therefore, that present seating facilities in railway coaches, busses and tram cars have serious objections, both from the standpoint of the operator and the public who would use them. The luxury and comfort of automobile travel offers increasing competition to railway, bus and tram car transportation. In order to meet this type of competition and to maintain its proper place in the transportation industry, railway, bus and tram car operators are compelled to adopt measures insuring greater comfort and luxury to the traveler without loss of carrier capacity. The provision of car seats comfortable, attractive and secure, permitting a maximum seating capacity consonant with comfort, is a basic requirement in solving the problem.

The principal object of my invention is to provide a seat for railway coaches, tram cars and busses, and the like, which embodies greater ease and comfort than those now generally in use, and at the same time conserves seating space to the utmost, and permits facing in different directions.

Another object of my invention is to provide a seat having an inclined back rest, comfortable and well upholstered, adapted for horizontal reversal to change its facing aspect, without requiring any substantial additional spacing between seats to permit the reversal movement, other than the space strictly required for comfortable seating.

Another object of my invention is to provide a car seat having a comfortably inclined, well upholstered back rest stationary with respect to the seat cushion, the entire seat being adapted for reversal in facing aspect without substantial reduction of seating capacity of the conveyance in which it is placed, the reversal in facing direction being accomplished by a series of rotative, shifting and tilting movements of the seat cushion and back rest with respect to its base support.

A further object of my invention is to provide a coach seat of the character described which is simple, sturdy and durable in construction, easy to install in a railway coach, bus, tram car or the like, and can be easily and quickly revolved and reversed in seating direction.

Other objects of my invention will be in part obvious and in part pointed out hereinafter.

In accordance with my invention, my seat is of such construction that it will accommodate two passengers comfortably and will occupy so little space in the conveyance that comfortable seating accommodations may be provided for the usual number of passengers for that particular type of conveyance. At the same time, to retain great depth of springs and upholstery and comfortable pitch for both cushion and back when the seats are mounted close enough together to accommodate the usual number of passengers, the seat is not only designed to revolve so as to permit of change of the facing direction of the seat, but means are provided to both shift and tilt the seat on its base during the revolution movement. This shifting and tilting of the seat take place at such times during the revolution movement thereof as to avoid interference with any adjacent seat and with the car wall, due to the width of the cushion or the overhang of the top edge of the back due to its pitch or inclination. Means are provided to cause the seat to automatically shift generally away from the car wall at the beginning of the rotation movement. Means are provided to tilt the seat about its front edge upon further rotation, raising the back edge thereof and also the back rest until the back rest stands substantially vertical. In this position the back rest cannot interfere with any adjacent seat or car wall. The greater portion of the rotation movement takes place while the seat is thus tilted. The seat is then gradually lowered to normal horizontal seating postion and finally is shifted back against the car wall, the facing direction of the seat being then completely reversed and the seat again ready for occupancy. The seat back is preferably permanently secured to the seat cushion portion.

The seat may be supported on a central pedestal with means provided for supporting the ends of the seat when fully turned to steady the same and prevent teetering. Preferably locking means are provided, which prevent the seat from being revolved after it has been turned to face either end of the car. The rest is preferably designed to revolve back and forth over an arc of 180°, but this is not essential and could as well be arranged to revolve back and forth in a complete circle.

In order that a clearer understanding of my invention may be had, attention is hereby directed to the accompanying drawings, forming a part of this application and illustrating certain possible embodiments of my invention.

Referring to the drawings, Fig. 1 is a front view of a complete car seat embodying my invention;

Fig. 2 is a side view of a complete car seat constituting the subject-matter of my invention and illustrating the comfortable pitch of the back rest when the seat is in normal seating position;

Fig. 3 is a side view of the car seat with the seat cushion in partly reversed position, illustrating the manner of tilting the seat cushion and raising the back rest from an inclined to a substantially vertical position to avoid interference with adjacent seats and car wall;

Fig. 4 is a top plan view of the car seat looking down thorugh the cushion rest, showing the manner of hinging one edge of the cushion rest to its horizontal support and the means for tilting the opposite edge of the cushion rest about its hinged edge, the location of various other parts of the seat mechanism being shown in dotted lines to more clearly bring out the construction;

Fig. 5 is a longitudinal and vertical cross-sectional view of my car seat in normal seating position, showing in particular the means for locking the seat cushion rotatively against movement, the cushion-rest tilting mechanism and the means for supporting the ends of the seat when fully turned to prevent teetering, the view being taken on line 5—5 of Fig. 4;

Fig. 6 is a transverse and vertical cross-sectional view of my car seat in normal seating position, showing in particular the mechanism for tilting the seat rest, the manner of supporting the same and the means for rotatably retaining the cushion-rest supporting drum on the supporting frame, the view being taken on line 6—6 of Fig. 4;

Fig. 7 is a fragmental cross-sectional view of the locking mechanism, taken on line 7—7 of Fig. 5;

Figure 8:
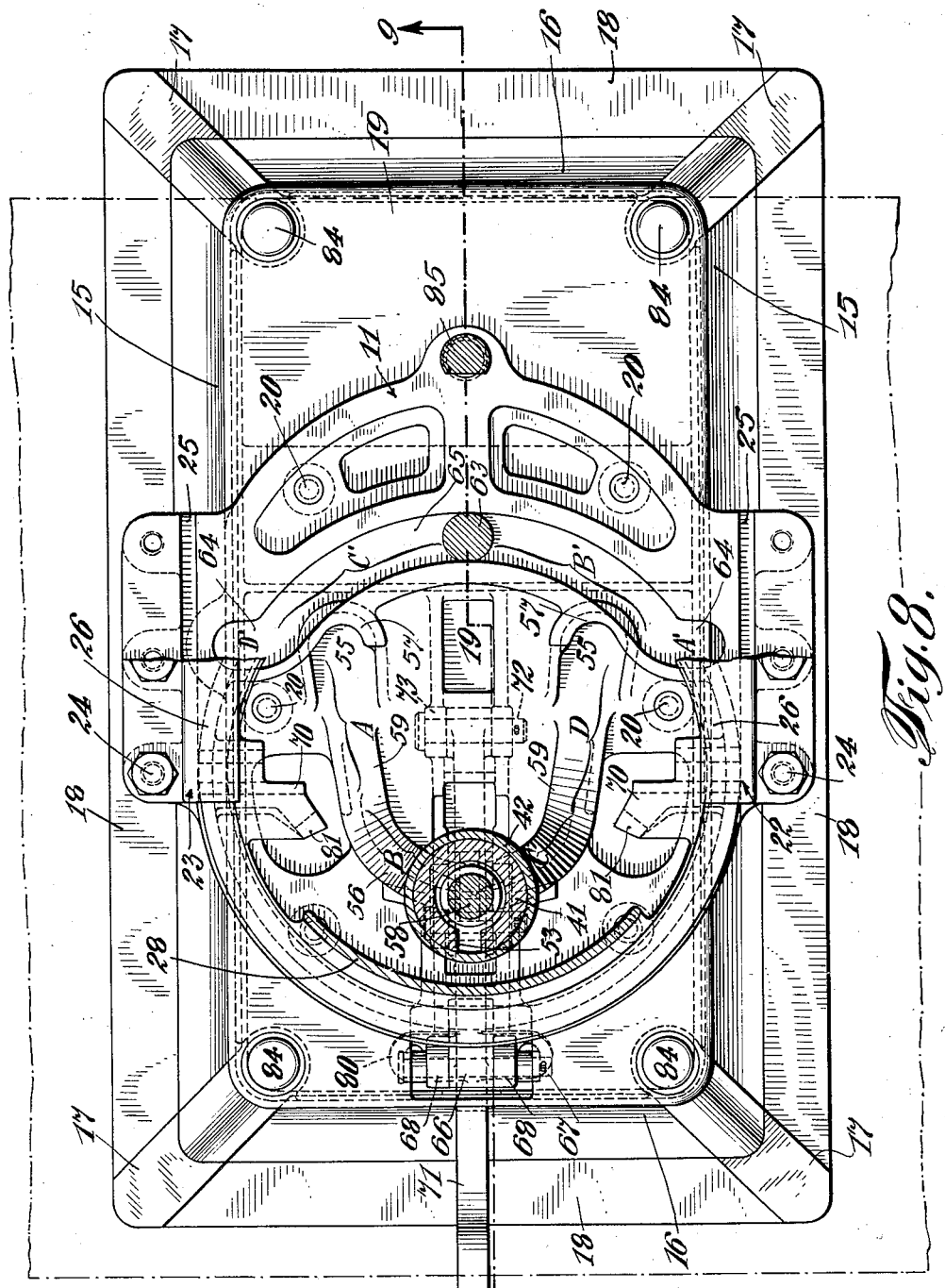

Fig. 8 is a horizontal cross-sectional view of my car seat taken when the seat is in maximum tilted position, and partly reversed position, showing in particular the tilting and the shifting mechanism and the guides secured along the sides of the supporting frame for rotatably and shiftably retaining the cushion-rest supporting drum on the supporting frame, the view being taken on line 8—8 of Fig. 9;

Fig. 9 is a transverse and vertical cross-sectional view of my car seat in tilting, partly reversed position, showing in particular the tilting mechanism, the manner of hinging the cushion-rest to its drum support, the cushion-rest shifting mechanism, and the locking mechanism disengaged from locking position, the view being taken on line 9—9 of Fig. 8.

Similar reference characters refer to similar parts throughout the several views of the drawings.

Referring to the drawings, my car seat comprises generally a supporting frame 10, a slide table 11 secured to the supporting frame and a cushion support comprising, a slide block 12 shiftable upon the slide table, a cushion-rest 13 secured to the slide block, and tilting mechanism 14 secured to the cushion rest and slidable over a rising and falling track associated with a slide table.

I preferably construct my supporting frame of metal box formation but any form of supporting frame-work may be used within the contemplation of this invention. The supporting frame shown in the drawings comprises side plates 15 and end plates 16 secured together by corner reenforcements 17. The lower ends of the side and end plates may be formed into spread footings 18. A cover plate 19 is secured to the top edges thereof.

The slide table 11 is preferably formed as a casting and is permanently secured to cover plate 19 by means of rivets or bolts 20. The slide block 12 of drum formation rests upon the slide table. The lower edge of the slide block is provided with an annular shoulder portion 21. Guide members 22 and 23 are secured to opposite sides of the slide table by means of bolts 24. A longitudinal groove may be cut along each side of the slide table to receive a longitudinal rib 25 formed on each of the respective guide members to better retain the guide members in fixed position. Each of the guide members is provided with a flange 26 which is adapted to overlap the annular shoulder formation 21 on the slide block. It is seen that the slide block is thus permitted to shift longitudinally on the slide table and also to rotate thereon, but is held against removal or transverse shifting by the guide members.

The top of the slide block is preferably cast into a railing formation 27 of elliptical shape, as shown in dotted lines Fig. 4. The longitudinal axis of the elliptical railing parallels the longitudinal axis of the seat. Side wall portions 28 and 29, extending only part way around the slide block, join the top railing portion 27 and the bottom shoulder portion 21. It is desirable that the slide block, as well as the entire pedestal structure, should be light in weight, sturdy and strong. While the slide block of the particular form above described has been found to possess these qualities to a marked degree, it is understood that I do not limit myself to a slide block of this particular form. A top plate 30 of rectangular form is secured to the elliptical frame of the slide block by any suitable means, as rivets 31. Cushion rest 13, illustrated in Figs. 6 and 9 as a wooden frame, is hinged along one edge of top plate 30 by means of hinges 32 secured to the cushion rest as by bolts 33 and to the plate 30 by rivets 34. The cushion rest may be of ordinary frame construction suitable to support an upholstered seat cushion.

It is within the contemplation of this invention to provide a car seat as comfortable and inviting as a luxurious lounge chair. This I obtain by providing a deeply upholstered, rearwardly inclined seat cushion 35, as shown in Figs. 1, 2 and 3, harmonized with the inclination and upholstery of the back rest 36. The back rest may be form fitting as shown in Figs. 1, 2 and 3, and may be either secured in fixed or hinged relationship to the cushion rest, but always in such a manner as to preserve the proper pitch when the back rest is in seating position. The seat ends 37 may be suitably upholstered and secured to the cushion rest. Reversal of facing direction of the seat is obtained by rotating the cushion rest and back rest secured thereto on its supporting structure, hereafter to be described.

It is evident that a merely simple rotation movement of a car seat adapted to seat two persons would require such a large amount of space to avoid interference with adjacent seats as to be entirely uneconomical and impracticable. Especially would this be true of a seat deeply upholstered and with back rest comfortably inclined. To permit facing reversal of my two-passenger car seat of lounge chair comfort without sacrifice of car seating capacity, I have provided tilting mechanism and shifting means adapted to tilt and shift the cushion rest when the seat is revolved in such a manner as to avoid interference with adjacent seats and the car wall along which the seat is disposed. I am thus enabled to construct car seats having seat cushions and back rests equal in comfort and restfulness to any lounge chair, fully reversible in facing direction without loss of car seating capacity.

My tilting mechanism comprises essentially a plunger connected to the cushion rest and movable over a rising and falling stationary track cast integral with the slide table. More particularly the tilting plunger comprises a cylindrical portion 38 telescoping within an upwardly extending guide cylinder 39. The guide cylinder has a flanged base portion 40 which seats upon the top plate 30 and a collar portion 41 extending through an opening in the top plate. The slide block has an inwardly extending table portion 42 cast integrally therewith, as shown in Figs. 4, 5 and 9. The collar portion 41 of the guide cylinder also extends through an opening in the table portion to give steadiness to the guide cylinder. Bolts or rivets 43 passing through the base portion 40 and table 42 may be used to permanently secure the guide cylinder into position.

A link member 44 inserted within a vertical slit 45 in cylinder portion 39 has its lower end journaled by means of a pin 46 to the plunger. The link is connected to the cushion rest by means of a suitable bracket. The bracket preferably comprises a pair of spread footings 47 and an upright post portion 48. The post portion 48 has a pair of inwardly extending lugs 49 cast integrally therewith, to which the upward end of the link is journaled by means of a pin 50. The bracket is secured to the seat rest by means of suitable bolts 51 passing through the spread footings and the cushion rest, the nuts 52 on the ends of the bolts being preferably countersunk into the bottom of the cushion rest so that the cushion rest will lie evenly on the top plate 30. The guide member 39 also has a vertical slit 53 therein, through which the link member 44 is adapted to swing when the seat is in horizontal seating position as shown in Fig. 6.

The lower end of the tilting plunger is provided with a head portion 54 having a hardened and rounded end. The rounded end is adapted to ride over a rising and falling track formed integral with the slide table. The track is generally U-shaped with its ends directed toward one end of the seat. The end portions 55 of the U-shaped track extend below the top surface of slide table as clearly shown in Fig. 6. The middle portion 56 of the U track rises above the top surface of the slide table as shown in Figs. 5 and 8. The end portions of the track are provided with an overhanging flange 57, shown in Fig. 8, which is adapted to engage a shoulder 58 on the head portion to retain the plunger fixed to the track when swung to these end positions. The cover plate 19 of the frame support may be suitably recessed to receive the depressed ends of the U-shaped track, as clearly shown in Fig. 6. When the cushion rest is in normal horizontal position and facing in one seating direction, it is understood that the head portion of the plunger is seated within one of the depressed end portions of the U-shaped track, flange 57 overlapping the shoulder 58 on the head portion to lock the cushion rest against tilting and to steady the seat generally.

When the cushion rest is swung in the reverse facing direction, head portion 54 will be seated within the other depressed end of the track. Upon each reversal of the seat, the head portion travels out of its retained position in the end portion of the track and moves over the corresponding inclined portion 59 thereof, causing the cushion rest to tilt about its hinges 32, as shown in Fig. 9. By this movement the cushion rest is so tilted that the inclined back rest avoids any interference with the adjacent seats or car wall. Upon further travel of the head portion along the top portion 56 of the track, the cushion rest is rotated through the major reversing angle. The head portion then proceeds down the corresponding inclined portion 59 of the track, lowering the cushion rest until it comes to horizontal and completely reversed position.

In order to accomplish the reversal movement in the least possible space, shifting movement of the cushion rest as well as the tilting movement is necessary. To accomplish this shifting movement I provide a stud element carried by the slide block and movable in a slot in the slide table. The stud element has a stem portion 60 which extends through an opening in the shoulder portion 21 of the slide block, in which it is adapted to rotate. The stud element is retained in place by means of a screw 61 extending through the block wall 28 and into a circumferential groove 62 in the stud element. The stud element has an enlarged head portion 63 adapted to contact the sides of the slot and move along the same. The slot is of such shape as to give the cushion rest the proper shifting movement. The end portions 64 of the slot extend a short distance transversely of the slide table, the middle portion 65 of the slot being circular.

When the seat is in normal seating position, head portion 54 of the tilting plunger is seated within one end of the track, as heretofore explained, and stud element 63 is positioned at the opposite end of the slot as shown in Figs. 4 and 6. Since the tilting plunger and stud element are carried by the cushion rest and slide block respectively, which are secured together, they move with the rotation of the seat. Referring now to Fig. 8, at the beginning of the reversal movement head portion 54 immediately begins to move, for example, out of the at rest position on the depressed end 55 of the track and over the inclined portion A of the track to tilt the cushion rest and move the same away from the car wall. During this movement stud element 63 moves out of the transverse end portion A' of the slot, moving the cushion rest longitudinally with respect to the car wall. Upon further reversal movement the head portion travels over segment B of the track and the stud element travels through segment B' of the slot. During this movement the cushion rest is rotated so that the front edge of cushion rest parallels the car wall, the back rest paralleling the car aisle. Upon further reversal movement the head portion travels over segment C of the track and stud element travels over segment C' of the slot, rotating the seat to substantially reverse facing position. In the final stage of the reversal movement head portion travels down the inclined segment D and stud element moves through transverse segment D'. During this movement the cushion rest is gradually lowered from its tilting position, moved back toward the car wall and also simultaneously shifted longitudinally with respect to the car wall to normal horizontal seating position. Thus it is seen that during the first stage of the reversal movement the seat cushion partakes of both a tilting movement and a shifting movement away from and longitudinally with respect to the car wall, during the second and third stages of the reversal movement the seat cushion is for the most part merely rotated through the major reversing angle, and during the last stage of the reversing movement the seat cushion is lowered from its tilting position to the normal horizontal seating position and shifted longitudinally with respect to and back toward the car wall.

It is advisable to provide means for locking the seat in either final position against reversal. Such means may comprise a locking dog 66 pivoted at one end by means of a pin 67 to a pair of lugs 68 cast integrally with the slide plate. The other end of the locking dog is provided with an upturned portion 69 extending through an opening in the top plate and slide table. The upturned portion is adapted to engage either one of two cooperating socket elements 70 cast integral with the slide block. It is understood that the socket elements are positioned one at each end of the seat, cooperating with the upturned portion to lock the seat against rotation, each being used for one of two final facing positions of the seat. The locking dog is moved into and out of locking position by means of a foot-piece 71 pivoted by means of a pin 72 fixed to a pair of lugs 73 integrally formed with a slide table. The foot piece is connected to the locking dog by means of a bracket 74 and a pin 75 extending through an elongated slot 76 in the locking dog. The locking dog and foot piece are normally held in raised position by means of a coil spring 77 carried on a bolt 78 secured at one end to the pin 67. The coil spring is retained on the pin by means of a nut 79 and pressed against a laterally extending lug 80 formed on the foot piece, resiliently holding the foot piece in raised position. It is seen that the locking dog is also held in raised position by means of this spring arrangement. The upper extending portion of the locking dog is preferably tapered so that when the cushion rest and shift block are rotated, the end of the locking dog will be engaged by an incline portion 81 laterally extending from the cooperating socket element to depress the locking dog until the tapered end thereof is opposite to the recess therein when the coil spring will cause the locking dog to snap into locking engagement therewith. A pin 69, projecting laterally from the locking dog 68, may be provided to abut against the edges of the opening in the slide table 11 through which upturned portion 69 extends, and thus limit the upward movement of the locking dog.

Means are provided to steady the seat when in horizontal seating position. To this end I provide post members 82 secured to depressed portions 83 at each corner of the top plate 30. These posts are so positioned that when the seat has been completely rotated for horizontal seating the ends of the posts are adapted to rest on mound portions 84 formed at each corner of the cover plate 19 as clearly shown in Fig. 5. Upon reversal movement the posts swing off from the respective mound portions and upon reversal of facing direction of the seat the posts at one end of the top plate come to rest on the mound portions on the other end of the cover plate.

A stud member 85 fixed to one end of the slide table forms an abutment to prevent the slide block from moving out of the influence of guide members 22 and 23. One side of the stud member may be slightly flattened, as shown more clearly in Fig. 8, forming an abutment surface for the slide block.

Since the full weight of the seat and its occupants falls upon the cover plate 19, an angle-iron 86 may be secured transversely to the cover plate to reenforce the same and give the supporting structure greater rigidity. It is preferable to make the seat supporting structure as light as possible without sacrifice of strength. The slide table and slide block are, therefore, cast with this end in view, skeletonizing the castings and ribbing the same where strength is necessary or excessive wear occurs.

Thus it is seen that I have constructed a reversible car seat, strong, durable and secure, equal in seating comfort to the most luxurious lounge chairs. With my reversible supporting structure it is seen that the seat cushions and back rest of my car seat can be designed with but one point in view, that of maximum seating and riding comfort; my tilting, shifting and rotating mechanism taking care of seat reversal with the necessary economy of space. Since the back rest can be made fixed to the cushion rest, the seat lends itself generally to more luxurious and attractive design than seats now in use.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. A vehicle seat of the character described, including in combination, a cushion rest, and means supporting said cushion rest for rotation and simultaneous tilting thereof, said means including a rider element and a track of rising and descending contour.

2. A vehicle seat of the character described, including in combination, a cushion rest, and means for supporting said cushion rest for tilting and simultaneous shifting with respect thereto, said means including a rider element and a track of rising and descending contour.

3. A vehicle seat of the character described, including in combination, a supporting frame, a cushion rest rotatably mounted on said frame for horizontal reversal, and means for tilting said cushion rest to avoid adjacent seats and the vehicle wall during the reversal movement, said means including a curved track of rising and descending contour secured to said supporting frame and an element carried by said cushion rest and adapted to ride over said track.

4. A vehicle seat of the character described, including in combination, a cushion rest, a back rest secured to said cushion rest, means rotatably supporting said cushion rest for horizontal reversal, and means for tilting said cushion rest so that the back rest secured thereto avoids the vehicle wall and adjacent seats as the cushion is revolved to reverse its facing aspect, said means including a rider element and a track of rising and descending contour.

5. A vehicle seat of the character described, including in combination, a cushion rest, an individual back rest secured thereto, means rotatably supporting said cushion rest for horizontal reversal, and means operative to automatically tilt said cushion rest out of and back into horizontal position during the rotation movement so that the back rest secured thereto avoids adjacent seats as the cushion rest is revolved to reverse its facing aspect, said means including a rider element and a track of rising and descending contour.

6. A vehicle seat of the character described, including in combination, a cushion rest, means rotatably supporting said cushion rest for horizontal reversal, and means for simultaneously tilting said cushion rest as the same is revolved to reverse its facing aspect, said tilting means including a rider element and a track of rising and descending contour.

7. A vehicle seat of the character described, including in combination, a supporting frame, a cushion rest rotatably mounted on said frame for horizontal reversal, means for shifting and means for tilting said cushion rest to avoid adjacent seats and the vehicle wall during reversal movement, said shifting means including a stud element and cooperating slot on the cushion rest and supporting frame, said tilting means including a curved track of rising and descending contour secured to the supporting frame and an element carried by the cushion rest adapted to ride over said track.

8. In a seat of the character described, in combination, a supporting frame, guide elements secured to said frame, a cushion rest including a block member of drum formation having shoulder portions which said guide elements are adapted to engage to shiftably and rotatably retain said cushion rest on said frame, and means including a stud and cooperating slot on said block member and supporting frame to limit the shifting movement of said drum.

9. In a seat of the character described, in combination, a supporting frame, a cushion rest rotatably mounted on said frame, and means for tilting said cushion rest at predetermined times during the rotation movement, said means including a track of rising contour carried by the supporting frame, a stud element adapted to ride on said track, and a link connecting said stud element to the cushion rest.

10. In a seat of the character described, in combination, a supporting frame, a cushion rest rotatably mounted on said frame, and means for tilting said cushion rest during the rotation movement, said means including a track of rising contour fixed to the supporting frame, a stud element adapted to ride on said track, guide means carried by the cushion rest, into which said stud element is adapted to telescope, and a link connecting the stud element to the cushion rest.

11. In a seat of the character described, in combination, a supporting frame, a cushion rest rotatably mounted on said frame for horizontal reversal, and means for tilting the cushion rest during the rotation movement, said means including a track of rising and descending contour secured to the supporting frame, and a stud element carried by the cushion rest and adapted to ride on said track, said stud element and track having cooperating means for holding the stud on the track at the end of the reversal movement.

12. In a seat of the character described, in combination, a supporting frame, a cushion rest rotatably mounted on said frame for horizontal reversal, and means for locking said cushion rest against rotation, said means including a foot-piece hinged to said frame, a locking dog hinged to said frame, and connected to said foot-piece, said cushion rest having a socket portion with which the locking dog is adapted to engage, and resilient means normally retaining the locking dog in locking engagement with said socket portion.

13. In a vehicle seat of the character described, in combination, a supporting frame, a block member shiftably and rotatably mounted on said frame, a top plate secured to said block member, a cushion rest mounted on said top plate, and post elements secured at spaced points to said top plate and adapted to rest upon said supporting frame to steady the cushion rest when in seating position.

14. In a vehicle seat of the character described, in combination, a supporting frame having a flat top surface, a block member shiftably and rotatably mounted on said frame, a top plate secured to said block member, a cushion rest mounted on said top plate, and post members secured at spaced points around the outer periphery of said top plate and adapted to rest upon said supporting frame to steady the cushion rest when in seating position.

This specification signed this 17th day of July, 1928.

ALFRED B. BELL.